United States Patent
Hertel et al.

(10) Patent No.: US 10,393,223 B2
(45) Date of Patent: Aug. 27, 2019

(54) COUPLING ARRANGEMENT HAVING A VIBRATION REDUCTION DEVICE AND HAVING A COUPLER DEVICE

(71) Applicant: ZF FRIEDRICHSHAFEN AG, Friedrichshafen (DE)

(72) Inventors: Martin Hertel, Bergrheinfeld (DE); Christian Weber, Ebersburg (DE); Joerg Sudau, Niederwerrn (DE); Thomas Bauer, Grossbardorf (DE); Michael Winterstein, Gochsheim (DE); Michael Wirachowski, Würzburg (DE); Axel Rohm, Schonungen (DE); Oliver Andres, Bamberg (DE); Christian Wickel, Wartmannsroth (DE); Florian Postler, Bamberg (DE); Matthias Kram, Wurzburg (DE); Nathalie Werner, Besigheim (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 145 days.

(21) Appl. No.: 15/519,079

(22) PCT Filed: Sep. 15, 2015

(86) PCT No.: PCT/EP2015/070995
§ 371 (c)(1),
(2) Date: Apr. 13, 2017

(87) PCT Pub. No.: WO2016/058762
PCT Pub. Date: Apr. 21, 2016

(65) Prior Publication Data
US 2017/0219048 A1    Aug. 3, 2017

(30) Foreign Application Priority Data
Oct. 15, 2014    (DE) .......... 10 2014 220 897

(51) Int. Cl.
*F16H 45/02* (2006.01)
*F16F 15/134* (2006.01)
(Continued)

(52) U.S. Cl.
CPC ............ *F16F 15/145* (2013.01); *F16D 13/40* (2013.01); *F16D 25/0635* (2013.01);
(Continued)

(58) Field of Classification Search
CPC ............. F16H 45/02; F16H 2045/0226; F16H 2045/0231; F16H 2045/0252;
(Continued)

(56) References Cited

U.S. PATENT DOCUMENTS 5,377,796 A * 1/1995 Friedmann ........ F16F 15/13423
                                                192/213
5,388,678 A * 2/1995 Murata ................... F16H 45/02
                                                192/3.29
(Continued)

FOREIGN PATENT DOCUMENTS

DE    11 2006 002 111    5/2008
DE    10 2009 042 837    4/2010
(Continued)

*Primary Examiner* — Richard M Lorence
*Assistant Examiner* — David R Morris
(74) *Attorney, Agent, or Firm* — Cozen O'Connor

(57) ABSTRACT

A coupling arrangement is provided with a vibration reduction device and with a clutch device. The vibration reduction device has at least one torsional vibration damper, an input connected to a drive, and an output connected to the clutch device by which a connection between the vibration reduction device and a driven end is at least substantially produced in a first operating state, and this connection is at least substantially cancelled in a second operating state. The vibration reduction device has a mass damper system that (Continued)

cooperates with the torsional vibration damper and is connected to the output of the vibration reduction device.

6 Claims, 7 Drawing Sheets

(51) Int. Cl.
| | | |
|---|---|---|
| *F16F 15/14* | (2006.01) | |
| *F16D 13/40* | (2006.01) | |
| *F16D 25/0635* | (2006.01) | |
| *F16F 15/131* | (2006.01) | |
| *F16D 25/0638* | (2006.01) | |

(52) U.S. Cl.
CPC .... *F16F 15/13121* (2013.01); *F16F 15/1421* (2013.01); *F16H 45/02* (2013.01); *F16D 25/0638* (2013.01); *F16D 2300/22* (2013.01); *F16F 15/134* (2013.01); *F16F 15/13128* (2013.01); *F16F 15/13476* (2013.01); *F16H 2045/0226* (2013.01); *F16H 2045/0231* (2013.01); *F16H 2045/0263* (2013.01); *F16H 2045/0284* (2013.01); *F16H 2045/0294* (2013.01)

(58) Field of Classification Search
CPC ..... F16H 2045/0263; F16H 2045/0284; F16H 2045/0294; F16F 15/13121; F16F 15/13128; F16F 15/134; F16F 15/13476
See application file for complete search history.

(56) References Cited

U.S. PATENT DOCUMENTS

| | | | | |
|---|---|---|---|---|
| 7,984,800 | B2* | 7/2011 | Frey | F16H 45/02 |
| | | | | 192/113.5 |
| 8,161,739 | B2* | 4/2012 | Degler | F16F 15/145 |
| 8,161,740 | B2* | 4/2012 | Krause | F16F 15/145 |
| | | | | 192/30 V |
| 8,695,771 | B2* | 4/2014 | Matsuoka | F16H 45/02 |
| | | | | 192/213.11 |
| 8,807,310 | B2* | 8/2014 | Takikawa | F16H 45/02 |
| | | | | 192/213.1 |
| 8,839,924 | B2* | 9/2014 | Takikawa | F16H 45/02 |
| | | | | 192/213.2 |
| 9,046,161 | B2* | 6/2015 | Takikawa | F16H 45/02 |
| 9,175,760 | B2* | 11/2015 | Mencher | F16H 45/02 |
| 9,285,024 | B2* | 3/2016 | Kombowski | F16H 45/02 |
| 9,382,989 | B2* | 7/2016 | Tomiyama | F16F 15/134 |
| 9,416,860 | B2* | 8/2016 | Amano | F16F 15/145 |
| 9,453,565 | B2* | 9/2016 | Lee | F16F 15/12 |
| 9,586,590 | B2* | 3/2017 | Weber | F16H 45/02 |
| 9,638,283 | B2* | 5/2017 | Wirachowski | F16F 15/145 |
| 9,683,644 | B2* | 6/2017 | Smith | F16D 33/18 |
| 9,732,835 | B2* | 8/2017 | Kawahara | F16F 15/1421 |
| 9,765,848 | B2* | 9/2017 | Wickel | F16D 3/12 |
| 9,791,019 | B2* | 10/2017 | Takikawa | F16F 15/134 |
| 9,797,471 | B2* | 10/2017 | Kram | F16F 15/145 |
| 9,909,644 | B2* | 3/2018 | Cegar | F16F 15/145 |
| 10,066,719 | B2* | 9/2018 | Hague | F16D 3/12 |
| 10,100,898 | B2* | 10/2018 | Kram | F16F 15/145 |
| 2008/0236975 | A1* | 10/2008 | Frey | F16H 45/02 |
| | | | | 192/3.29 |
| 2010/0193320 | A1* | 8/2010 | Kombowski | F16H 45/02 |
| | | | | 192/30 V |
| 2010/0236228 | A1* | 9/2010 | Degler | F16F 15/145 |
| | | | | 60/338 |
| 2010/0242466 | A1* | 9/2010 | Krause | F16F 15/145 |
| | | | | 60/327 |
| 2011/0031083 | A1* | 2/2011 | Matsuoka | F16H 45/02 |
| | | | | 192/3.29 |
| 2012/0080280 | A1* | 4/2012 | Takikawa | F16H 45/02 |
| | | | | 192/3.28 |
| 2012/0080281 | A1* | 4/2012 | Takikawa | F16H 45/02 |
| | | | | 192/3.28 |
| 2012/0080282 | A1* | 4/2012 | Takikawa | F16H 45/02 |
| | | | | 192/3.28 |
| 2014/0027230 | A1* | 1/2014 | Mencher | F16H 45/02 |
| | | | | 192/3.28 |
| 2014/0353105 | A1* | 12/2014 | Tomiyama | F16F 15/134 |
| | | | | 192/3.23 |
| 2014/0374207 | A1* | 12/2014 | Amano | F16F 15/145 |
| | | | | 192/3.28 |
| 2015/0090555 | A1* | 4/2015 | Miyahara | F16H 45/02 |
| | | | | 192/3.28 |
| 2015/0217774 | A1* | 8/2015 | Weber | F16H 45/02 |
| | | | | 701/53 |
| 2015/0285332 | A1* | 10/2015 | Kram | F16F 15/145 |
| | | | | 74/574.2 |
| 2015/0316124 | A1* | 11/2015 | Wirachowski | F16F 15/145 |
| | | | | 464/51 |
| 2015/0354684 | A1* | 12/2015 | Lee | F16F 15/12 |
| | | | | 192/3.29 |
| 2015/0369332 | A1* | 12/2015 | Wickel | F16D 3/12 |
| | | | | 464/68.8 |
| 2016/0169358 | A1* | 6/2016 | Kawahara | F16F 15/1421 |
| | | | | 192/3.28 |
| 2016/0208885 | A1* | 7/2016 | Takikawa | F16F 15/134 |
| 2016/0208886 | A1* | 7/2016 | Siemens | F16F 15/145 |
| 2016/0208887 | A1* | 7/2016 | Kram | F16F 15/145 |
| 2016/0298721 | A1* | 10/2016 | Cegar | F16F 15/145 |
| 2017/0023096 | A1* | 1/2017 | Hertel | F16H 45/02 |
| 2017/0138453 | A1* | 5/2017 | Smith | F16D 33/18 |
| 2017/0219048 | A1* | 8/2017 | Hertel | F16F 15/1421 |
| 2017/0292593 | A1* | 10/2017 | Hague | F16D 3/12 |
| 2017/0299015 | A1* | 10/2017 | Hess | F16F 15/145 |
| 2017/0350487 | A1* | 12/2017 | Muller | F16H 41/24 |

FOREIGN PATENT DOCUMENTS

| | | |
|---|---|---|
| DE | 10 2009 042 825 | 5/2010 |
| DE | 10 2009 050 353 | 5/2010 |
| DE | 10 2011 075 244 | 12/2011 |
| DE | 10 2011 013 480 | 9/2012 |
| DE | 10 2011 076 790 | 12/2012 |
| DE | 10 2012 219 799 | 5/2013 |
| DE | 10 2013 216 509 | 3/2014 |
| DE | 10 2014 212 790 | 1/2015 |
| DE | 10 2014 221 573 | 5/2015 |
| EP | 2 600 030 | 6/2013 |
| FR | 3 011 602 | 4/2015 |

\* cited by examiner

COUPLING ARRANGEMENT HAVING A VIBRATION REDUCTION DEVICE AND HAVING A COUPLER DEVICE

CROSS REFERENCE TO RELATED APPLICATIONS

This is a U.S. national stage of application No. PCT/EP2015/070995, filed on Sep. 15, 2015. Priority is claimed on German Application No.: DE102014220897.1, filed Oct. 15, 2014, the content of which is incorporated here by reference.

BACKGROUND OF THE INVENTION

1. Field of the Invention

The present invention is directed to a coupling arrangement with a vibration reduction device and with a clutch device, wherein the vibration reduction device has at least one torsional vibration damper an input connected to a drive, and an output connected to the clutch device by which a connection between the vibration reduction device and a driven end is at least substantially produced in a first operating state, and this connection is at least substantially cancelled in a second operating state.

2. Description of the Prior Art

A coupling arrangement of this kind can be seen from DE 11 2006 002 111 T5. With regard to the vibration reduction device, the housing of this coupling arrangement formed with an impeller, a turbine, and stator that acts as a drive. The vibration reduction device has a torsional vibration damper with two damping units arranged with a radial offset relative to one another. The output of the torsional vibration damper is connected to a friction disk element carrier of the clutch device which can be brought into operative connection with a further friction disk element carrier of the clutch device via a plurality of friction disk elements. The further friction disk element carrier mentioned above, which has a connection to the turbine, is fastened to a hub that acts as driven end of the vibration reduction device and can have a rotational connection to a driven shaft, for example, a transmission input shaft.

Insofar as the first operating state mentioned above is present, the hydrodynamic circuit of the coupling arrangement serving as hydrodynamic torque converter is to be bridged by the clutch device, this hydrodynamic circuit being formed by the impeller, turbine, and stator. In this regard, while the torsional vibration damper serves to reduce torsional vibrations superimposed on the transmitted torque, it is incapable of having any effect with respect to excitations, the order of which depends on the cylinder number of an internal combustion engine responsible for transmitting a torque to the housing of the coupling arrangement.

To have an effect during excitations of this kind, a preferred vibration reduction device has a mass damper system. A vibration reduction device of this kind can be seen from DE 10 2011 076 790 A1, FIG. 3. However, in contrast to the previously discussed coupling arrangement, the clutch device in this case is arranged between the housing of the coupling arrangement and the vibration reduction device and is therefore connected to the input of the torsional vibration damper whose output is in operative connection with a driven end realized as torsional vibration damper hub. The mass damper system mentioned above is likewise connected to the output of the torsional vibration damper.

In torsional vibration dampers with a vibration reduction device whose output is connected to a mass damper system, there is the advantage of very minor rotational irregularities even under full load at very low speed, for example, at a speed of 1,000 revolutions per minute. However, against this advantage an appreciable rise in rotational irregularity is noted at higher speed, for example, within a speed range between 1,500 and 1,800 revolutions per minute. This rise in rotational irregularity is accompanied by sharply dropping deflection angles at the output of the torsional vibration damper, even when torsional vibrations are present at the input of the torsional vibration damper. This behavior of the torsional vibration damper whose output persists at least approximately in a vibration node is caused by effects stemming from the transmission arrangement. It is especially disadvantageous that the output of the torsional vibration damper dwells in a vibration node because the vibration excitations which would be urgently required for the functioning of damper masses of the mass damper system connected to the output of the damping device are lacking in this case. This applies particularly to the above-mentioned appreciable rise in rotational irregularity.

When the clutch device is arranged between the housing of the coupling arrangement and the vibration reduction device, there is a difference in speed between the excitations present at the drive and the excitations present at the mass damper system when the clutch device acts with slip; this has an influence on the resulting excitation order of the mass damper system. If the mass damper system were configured for compensation on a higher order, this would result in an impairment of the decoupling quality in all operating states in which there is no significant slip. Under these circumstances, the configuration of the mass damper system is problematic.

SUMMARY OF THE INVENTION

It is an object of one aspect of the invention to construct a coupling arrangement with a vibration reduction device and with a clutch device such that the configuration of the mass damper system is optimized and a rise in rotational irregularity is at least limited in a determined speed range.

The vibration reduction device has an input which is connected to a drive and has an output which is connected to the clutch device by which a connection between the vibration reduction device and a driven end is at least substantially produced in a first operating state, and this connection is at least substantially cancelled in a second operating state. The vibration reduction device has a torsional vibration damper and a mass damper system which is connected to the output of the vibration reduction device.

The following substantial advantages result from the fact that the mass damper system is connected to the output of the vibration reduction device:

Since the mass damper system is connected to the drive via the torsional vibration damper, there is no intermediate clutch device which could permit slip depending on the respective operating state. This ensures that the excitation present at the mass damper system is always identical in speed with the excitation present at the drive. Accordingly, the mass damper system can be configured exactly to the respective order, this configuration being unaffected by the respective operating mode of the clutch device, particularly during slip.

At the same time, slip can be used deliberately at the clutch device in order to at least partially remedy an unfavorable decoupling performance of the mass damper system. Slip may reduce rotational irregularities transmitted to a powertrain, particularly to a transmission. This is true particularly when an appreciable rise in rotational irregularity is noted at higher speed, for example, within a speed range between 1,500 and 1,800 revolutions per minute, through connection of the mass damper system to the output of the torsional vibration damper. The clutch device can accordingly be operated with specific slip in this speed range.

Since the output of the vibration reduction device does not act on the driven end directly but rather via the clutch device, at least the output of the vibration reduction device must be able to execute relative rotational movements with respect to the driven end in order to ensure the functioning of the clutch device. Therefore, the torsional vibration damper may be centered at the driven end, possibly also at the drive, but there must be a relative rotational movability in circumferential direction. Particularly in torsional vibration dampers with a plurality of damping units, other component parts of the respective torsional vibration damper, for example, an intermediate transmission interconnecting the damping units, can also be received in a comparable manner at the driven end or possibly at a drive.

When the clutch device is constructed with a plurality of friction disk couplers to transmit high torques, these friction disk couplers are particularly preferably received in friction disk coupler holders, one of which is connected to the output of the vibration reduction device so as to be fixed with respect to rotation relative to it, and another friction disk coupler holder is connected to the driven end.

BRIEF DESCRIPTION OF THE DRAWINGS

The invention is illustrated with reference to the following description. The drawings show.

DETAILED DESCRIPTION OF THE PRESENTLY PREFERRED EMBODIMENTS

Figure 1:
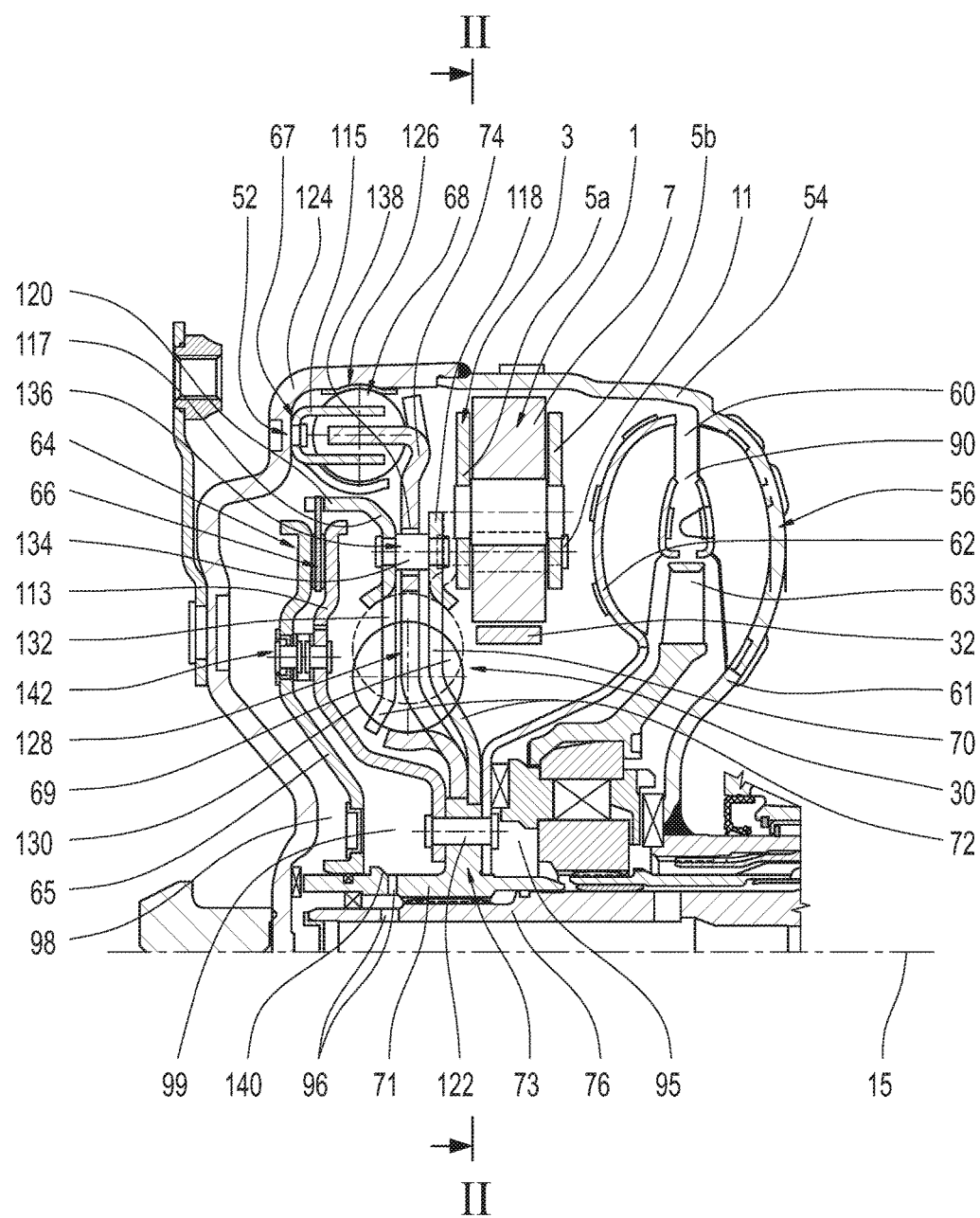
FIG. 1 is a sectional view through a coupling arrangement which is constructed as hydrodynamic torque converter with two-line system, and a vibration reduction device having a torsional vibration damper and mass damper system, and a clutch device which is connected to the output of the vibration reduction device.

FIG. 1 shows a coupling arrangement 56 having a housing 54 the rotatable around a central axis 15 and, since it is formed as hydrodynamic torque converter 90, a hydrodynamic circuit 60 with impeller 61, turbine 62 and stator 63. Further, the coupling arrangement 56 is provided with a vibration reduction device 30 and with a clutch device 64, the vibration reduction device 30 having a torsional vibration damper 70 and a mass damper system 1.

Fastened to a housing cover 124 of the housing 54 of the coupling arrangement 56 is an input component 115 with control fingers running parallel to one another and extending away from the housing cover 124, which input component 115 extends with the control fingers into the cross-sectional extension area of a radially outer energy storage system 126. Control fingers of an intermediate transmission 74 extend radially between the two control fingers of the input component 115 in each instance, and the control fingers of the intermediate transmission project in direction facing the housing cover 124 into the cross-sectional extension area of the radially outer energy storage system 126.

The intermediate transmission 74 extends at least substantially radially inward so as to receive energy storages of a radially inner energy storage system 130 in the radially inner area in energy storage windows 128. Axially on both sides of the intermediate transmission 74 are output components 117, 118 which have energy storage windows 132 for the energy storages of the radially inner energy storage system 130. The output components 117, 118 are held by spacer pieces 134 at a predefined axial distance relative to one another and relative to the intermediate transmission 74 and extend through recesses in the intermediate transmission with clearance in circumferential direction. When, during a relative rotational deflection of intermediate transmission 74 and output components 117, 118, the spacer pieces 134 have reached the ends of the recesses following in deflection direction, the relative rotational deflection ceases. The spacer pieces 134 accordingly act as relative rotational angle limitation 136.

Together with the radially outer energy storage system 126 and the intermediate transmission 74, the input component 115 form an input-side first damping unit 68 of the torsional vibration damper 70, while the intermediate transmission 74 together with the radially inner energy storage system 130 and the output components 117, 118 form an output-side second damping unit 69 of the torsional vibration damper 70.

Both the intermediate transmission 74 and the output component 118 are centered and possibly also axially positioned on axially stepped outer diameter portions of a torsional vibration damper hub 71, but can move in circumferential direction relative to the torsional vibration damper hub 71 as well as relative to one another.

The housing 54 of the coupling arrangement 56 acts as drive 52 for the vibration reduction device 30. The input component 115 serves as input 67 of the vibration reduction device 30, while output components 117, 118 act as output 72 of the vibration reduction device 30. The output 72 is centered at the torsional vibration hub 71 which acts as driven end 73 and which is received in turn by means of a toothing 77 at an output shaft 76 such as a transmission input shaft.

The torsional vibration damper hub 71 is supported axially at the housing cover 124 and centers a clutch piston 65 of the clutch device 64 in an axially displaceable manner. Alternatively, however, a component part which is independent from the torsional vibration hub 71 can also be provided for centering the clutch piston 65, and this component part can be supported via the torsional vibration damper hub 71 and can be connected to the latter. Regardless of this, the clutch piston 65 is fastened by an axial suspension 142 to a receptacle component part 113 of the clutch device 64 so as to be fixed with respect to rotation relative to it. Like the turbine 62, the receptacle component part 113 is fastened to the torsional vibration damper hub 71 by riveting 122. Depending on the control of the clutch piston 65 with respect to the receptacle component part 113, the clutch piston 65 is axially displaceable along the torsional vibration damper hub 71, and its movement in direction of the receptacle component part 113 is limited by an axial stop 140. When the clutch piston 65 moves in direction of the receptacle component part 113, it approaches its engagement position in a first operating state, while the clutch piston 65 approaches its disengagement position as a result of a movement in opposite direction in a second operating state.

Figure 2:
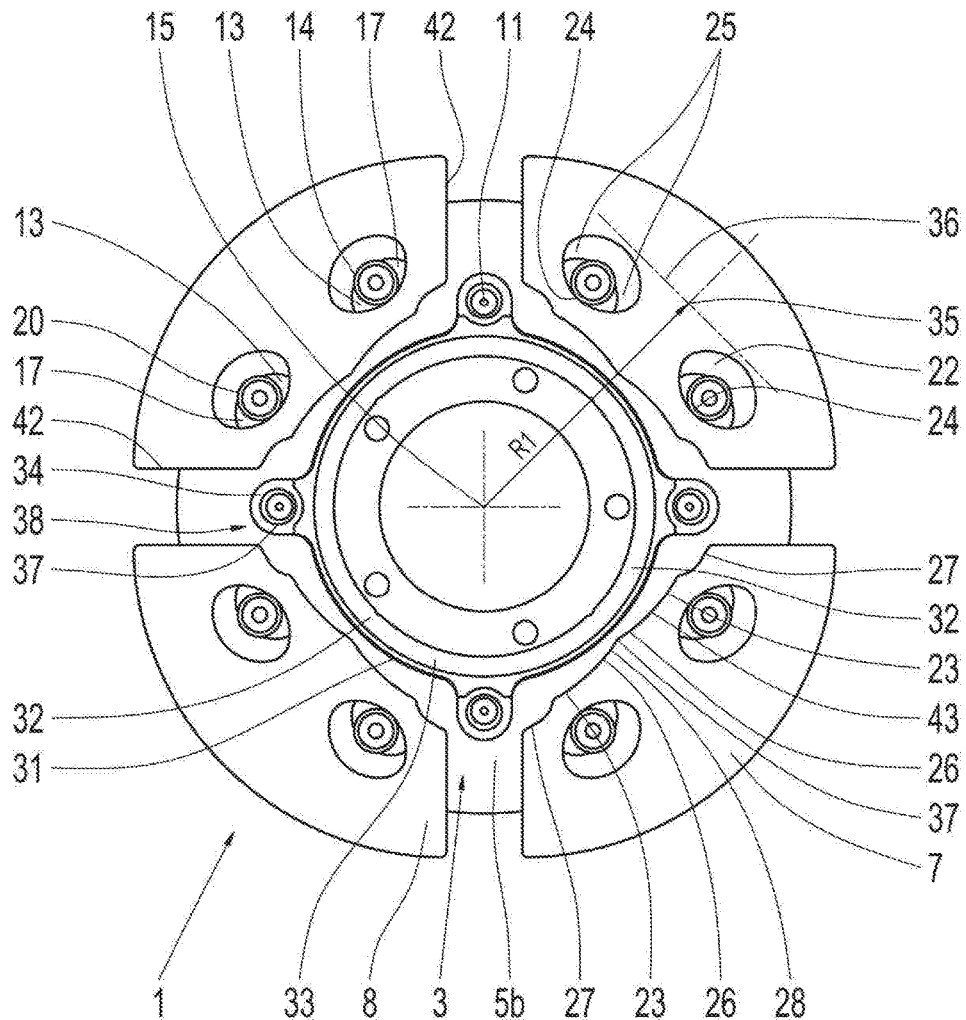
FIG. 2 is a top view of the mass damper system from viewing direction II-II in FIG. 1 in the operating state.
Figure 3:
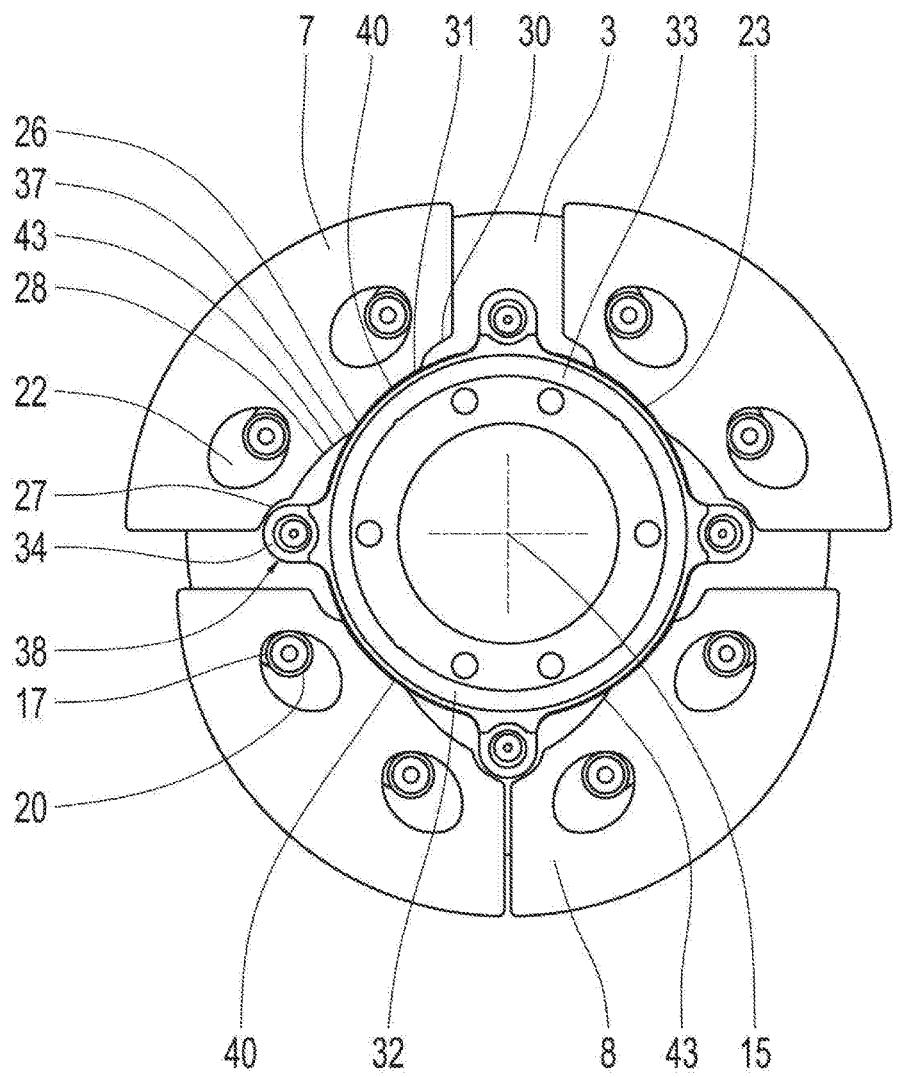
FIG. 3 is a top view from II-II with the mass damper system in neutral state.

Referring again to the vibration reduction device 30, this vibration reduction device 30 receives a damper mass carrier element 5a of a damper mass carrier 3 of the mass damper system 1 at its output component 118 facing the turbine 62 in a second function of this output component 118. The two damper mass carrier elements 5a, 5b are positioned at a predetermined axial distance from one another by spacer pieces 11 and receive damper masses 7 axially therebetween. As will be explained in more detail in the following, the spacer pieces 11 serve in a second function to receive an annular component part 32 (FIGS. 2,3). The output component 117 remote of the turbine 62 serves—likewise for a second function—as friction disk coupler carrier 120 at which a friction disk coupler 66 engaging axially between clutch piston 65 and receptacle component part 113 is received so as to be fixed with respect to rotation relative to it but so as to be axially displaceable. Since the output components 117, 118 are part of the output 72, both the mass damper system 1 and clutch device 64 are respectively connected to the output 72.

When the clutch piston 65 of the clutch device 64 is to be moved in direction of the receptacle component part 113 in a first operating state in order to produce a connection between the vibration reduction device 30 and the driven end 73, pressure medium is directed via a first line 95 by a pressure source, not shown, into the hydrodynamic circuit 60 and, therefore, also into a first pressure chamber 98 that extends on one side of the clutch piston 65. Accordingly, a positive pressure is formed in the first pressure chamber 98 compared to the second pressure chamber 99 located on the opposite side of the clutch piston 65. The clutch piston 65 is accordingly displaced in direction of the receptacle component part 113 and, in so doing, clamps the friction disk coupler 66 increasingly firmly between itself and the receptacle component part 113. During this movement of the clutch piston 65, pressure medium contained in the second pressure chamber 99 is discharged from the second pressure chamber 99 via a second line 96 which is without pressure in this operating state and then arrives in a pressure medium reservoir, not shown.

For a movement of the clutch piston 65 in its second operating state, the clutch piston 65 is moved in direction away from the receptacle component part 113 in order to cancel the connection between the vibration reduction device 30 and the driven end 73 again. To this end, pressure medium is guided by the pressure source, not shown, via the second line 96 into the second pressure chamber 99 so that a positive pressure is formed therein relative to the first pressure chamber 98. The clutch piston 65 is accordingly displaced in direction away from the receptacle component part 113 and increasingly releases the friction disk coupler 66 between itself and the receptacle component part 113. During this movement of the clutch piston 65, pressure medium contained in the first pressure chamber 98 is discharged from the first pressure chamber 98 via the first line 95 which is without pressure in this operating state and arrives in the pressure medium reservoir, not shown. The coupling arrangement 56 shown in FIG. 1 is referred to in technical circles as a two-line system because of the two existing lines 95 and 96.

The axial spring 142 is either configured in such a way that it tends to keep the clutch piston 65 at a distance from receptacle component part 113 or is configured in such a way that it tends to press the clutch piston 65 in direction of the receptacle component part 113. In the first case, any drag losses that can occur when the friction disk coupler 66 adheres to the clutch piston 65 or to the receptacle component part 113 when the clutch piston 65 is at least partially disengaged can be reduced, while in the latter case a smaller pressure gradient between the first pressure chamber 98 and the second pressure chamber 99 is sufficient to hold the clutch device 64 in engaged position in its first operating state. Further, the axial spring 142 is able to counteract changes in pressure that can occur abruptly for reasons relating to flow. This promotes engagement of the clutch device 64 with reduced jerking.

Torsional vibrations or excitations that are transmitted from housing 54 via input 67 to the torsional vibration damper 70 together with a torque present at housing 54 are damped by the damping units 68, 69 on the one hand and are absorbed by the mass damper system 1 on the other hand. Owing to the direct connection of the mass damper system 1 to the housing 54 and, therefore, to the drive 52 via the torsional vibration damper 70, it is ensured that the excitation present at the mass damper system 1 is always identical in speed to the excitation present at the drive 52. In this way, the mass damper system 1 can be configured exactly to the order linked to the drive 52.

Insofar as a vibration node has an influence on the output 72, at least approximately, in the vibration reduction device 30 in which there is a connection between output 72 and mass damper system 1, there is the option of selectively using slip at the clutch device 64 so that a more pronounced rotational regularity is present at the clutch device 64 and accordingly at least at output 72 of the vibration reduction device 30, which is required for a sufficiently good decoupling performance of the mass damper system 1. Since the clutch device 64 is provided downstream of the mass damper system 1, the mass damper system 1 remains configured to the order linked with the drive 52 without being influenced in spite of this step.

The following is noted with respect to the mass damper system 1:

For the sake of better visibility of the damper masses 7 received at the damper mass carrier 3, the damper mass carrier element 5a arranged axially in front of the damper masses 7 in viewing direction is omitted in FIGS. 2 and 3 and only the damper mass carrier element 5b arranged axially behind the damper masses 7 in viewing direction is illustrated. Damper masses 7 have guide paths 22 formed in pairs for receiving coupling elements 20, which are constructed as rolling elements, these guide paths 22 being configured in such a way that they allow a radial movement of the damper masses 7 relative to the coupling elements 20. The damper masses 7 have stop sides 43 radially inwardly adjoining their circumferential sides 42.

Guide paths 13 are provided in pairs at the damper mass carrier elements 5a and 5b in each instance. These guide paths 13 extend in a curved manner. Referring to the view in FIG. 2 or 3, the guide paths 13 have in each instance an initial region 14 in which the respective guide path 13 has the greatest radial distance from a central axis 15 and connection regions 17, which extend circumferentially opposite one another so as to adjoin at both sides of the initial region 14. The guide paths 22 provided at the damper masses 7 also run in a curved manner with, in each instance, an initial region 24 in which the respective guide path 22 has the shortest radial distance from the central axis 15 and connection regions 25 which extend circumferentially opposite one another so as to adjoin at both sides of the initial region 24. The guide paths 22 are provided in each instance on both sides of a damper mass center 35 of the respective damper mass. This damper mass center 35 is located in a central extension radius 36 of the damper masses 7 arranged at a distance R1 from the central axis 15 during driving operation. FIG. 2 shows the state of the damper masses 7 during driving operation when the mass damper system 1 is operated at a speed at which the centrifugal force exceeds the weight force.

The coupling elements 20 received in guide paths 13 and 22 engage in each instance on both sides of the respective guide path 22 in the guide paths 13 provided there. In the diagram shown in FIG. 2, the damper masses 7 tend radially outward under centrifugal force so that the coupling elements 20 position themselves in each instance in the initial region 24 of the respective guide path 22, i.e., in that region having the shortest radial distance from the central axis 15. The coupling elements are supported in each instance in the initial region 14 of the damper mass carrier elements 5a and 5b, i.e., in that region having the greatest radial distance from the central axis 15.

Each of the damper masses 7 has at the radially inner ends thereof in each instance a geometric shaping 28 having a first contact region 26 in the circumferentially middle portion, but having second contact regions 27 in the circumferentially outer portions. The first contact region 26 has a region center 37 which divides the first contact region 29 into shaping-halves 23. In a manner which is yet to be described, this geometric shaping 28 cooperates with stops 31 which are provided radially inwardly of the damper masses 7 and which are brought together at an annular component part 32.

In circumferential direction between every two damper masses 7, the annular component part 32 has in each instance a holder 34 that encloses a spacer 11 in each instance such that the holder 34 serves in each instance as a stop receiver 38. The annular component part 32 is accordingly received at the damper mass carrier 3 so as to be fixed with respect to relative rotation. An annular body 33 extending in circumferential direction acts between every two stop receivers 35 as a stop profile 40 in each instance. Together, stop receivers 38 and stop profiles 40 form common stops 31 at the annular component part 32.

When the mass damper system 1 is operated at a speed at which the centrifugal force exceeds the weight force, the damper masses 7 tend radially outward under centrifugal force so that the coupling elements 20 can position themselves in the initial region 24 of the respective guide path 22 of the damper masses 7 in each instance. While torsional vibrations can force deflections of the damper masses 7 in circumferential direction so that the coupling elements 20 are deflected out of the initial regions 14, 24 of the guide paths 13, 22 into the connection regions 17, 25 thereof, the coupling elements 20 are always returned to the initial position under centrifugal force as the torsional vibration decays.

However, when the centrifugal force drops below the weight force, for example, in creep mode of a motor vehicle or when stopping a drive, e.g., an internal combustion engine, the damper masses 7 drop radially inward and occupy a relative position, shown in FIG. 3, with respect to one another and to the damper mass carrier 3. In an operating condition of this type, the two damper masses 7 located radially above the central axis 15 drop radially inward until their stop sides 42 have made contact, by the shaping-half 23 of the first contact region 26 that is relevant for the movement direction, with the associated stop profile 40 of the stop 31 at the annular body 33 of the annular component part 32. If the guide paths 13, 22 should permit a further movement of the damper masses 7 radially downward, this movement will not end until the second circumferential region 27 of the respective damper mass 7 relevant for the movement direction comes in contact with the holder 34 and, therefore, with the stop receiver 38 of the annular component part 32. The two damper masses 7 located radially below the central axis 15 likewise drop radially inward until their stop sides 43 have come into contact, by the first contact regions 26 shaped thereon and which are relevant for the movement direction, with the associated stop profile 40 of stop 31 at annular body 33 of the annular component part 32 and until, further, the second contact regions 27 of the respective damper masses 7, which second contact regions 27 are relevant for the movement direction, have made contact with the corresponding holders 34 and, therefore, with the stop receivers 38 of the annular component part 32. In this way, the two damper masses 7 located radially below the central axis 15 are prevented from making contact with one another by their circumferential sides 42.

Figure 4:
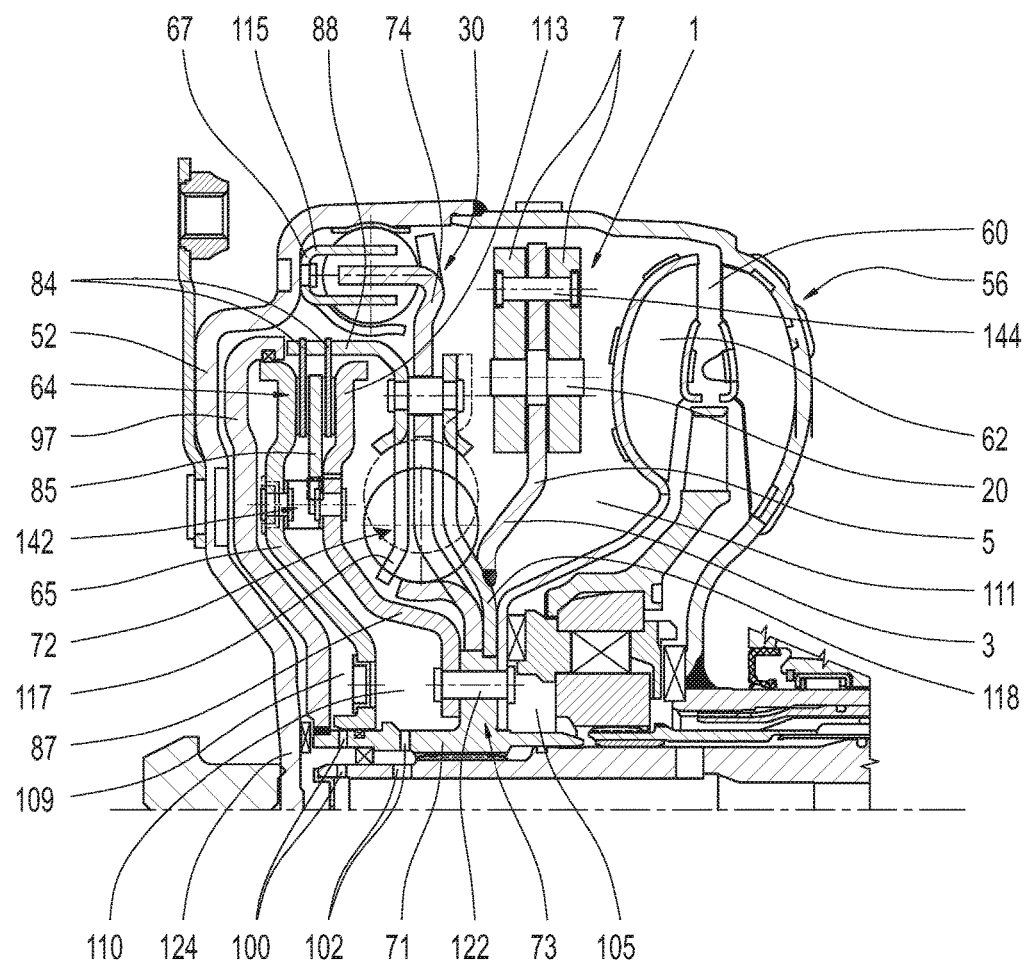
FIG. 4 is the coupling arrangement formed as three-line system.

FIG. 4 shows coupling arrangement 56 that is different than the coupling arrangement 56 discussed up to this point as regards construction and control of the clutch device 64 as well as with respect to the construction of the mass damper system 1.

As concerns the clutch device 64, a greater quantity of radially outer friction disk couplers 84 and a radially inner friction disk coupler 85 axially between the latter are provided as can be seen from FIG. 4. The radially outer friction disk couplers 84 are received in a manner comparable to FIG. 1 at a radially outer friction disk coupler carrier 88 so as to be fixed with respect to rotation but axially displaceable relative to it; this friction disk coupler carrier 88 is formed at the cover plate 117 at the housing cover side and is therefore part of output 72. On the other hand, the radially inner friction disk coupler 85 is received at the receptacle component part 113 so as to be fixed with respect to rotation relative to it, and receptacle component part 113 accordingly serves in an auxiliary function as radially inner friction disk coupler carrier 87. Like the turbine 62, the receptacle component part 113 is fastened to the torsional vibration damper hub 71 by means of riveting 122.

When the clutch piston 65 of the clutch device 64 is to move in direction of the receptacle component part 113 in a first operating state in order to make a connection between the vibration reduction device 30 and the driven end 73, pressure medium is guided via a first line 100 by means of a pressure source, not shown, into a first pressure chamber 109 that extends between a wall 97 and the clutch piston 65, the wall 97 running axially between the housing cover 124 and the clutch piston 65 and being centered at the torsional vibration damper hub 71. Accordingly, there results in the first pressure chamber 109 a positive pressure relative to a second pressure chamber 110 which is located at the opposite side of the clutch piston 65 axially between the latter and the receptacle component part 113. The clutch piston 65 is accordingly displaced in direction of the receptacle component part 113 and, in so doing, clamps the friction disk couplers 84 and 85 increasingly firmly between themselves and the receptacle component part 113. During this movement of the clutch piston 65, pressure medium contained in the second pressure chamber 110 is discharged from the second pressure chamber 110 via a second line 102 which is without pressure in this operating state and then arrives in a pressure medium reservoir, not shown.

For a movement of the clutch piston 65 in its second operating state, the clutch piston 65 is moved in direction away from the receptacle component part 113 in order to cancel the connection between the vibration reduction device 30 and the driven end 73 again. To this end, pressure medium is guided by the pressure source, not shown, via the second line 102 into the second pressure chamber 110 so that a positive pressure is formed therein relative to the first pressure chamber 109. The clutch piston 65 is accordingly displaced in direction away from the receptacle component part 113 and increasingly releases the friction disk couplers 84 and 85 between itself and the receptacle component part 113. During this movement of the clutch piston 65, pressure medium contained in the first pressure chamber 109 is discharged from the first pressure chamber 109 via the first line 100 which is without pressure in this operating state and arrives in the pressure medium reservoir, not shown.

In case the axial suspension 142 which has already been mentioned exerts an effect in disengagement direction of the clutch device 64, a pressure equilibrium between the pressure chambers 109 and 110 can already be sufficient for the above-mentioned movement of the clutch piston 65.

A third pressure chamber 11 receives both the hydrodynamic circuit 60 and the vibration reduction device 30 and is supplied with pressure medium via a third line 105. Especially when the clutch device 64 is open, pressure medium can be guided from the third pressure chamber 111 via the second pressure chamber 110 and the second line 102, which is without pressure in this operating state, can arrive in the pressure medium reservoir, not shown.

In view of the three existing lines 110, 102 and 105, the coupling arrangement 56 shown in FIG. 4 is known in technical circles as a three-line system. Owing to the limited extension of the two pressure chambers 109 and 110, this allows the clutch device 64 to be controlled in an improved manner. This also makes it possible to transmit higher torques supplied by the drive 52 via input 67 of vibration reduction device 30, specifically by the pressure characteristics in the coupling arrangement 56 and by the greater quantity of frictional connections at friction disk couplers 84 and 85.

With respect to the mass damper system 1, it should be added that the damper mass carrier 3 is again in this case fastened to the output component 118 adjacent to the turbine 62 and is accordingly fastened to output 72 of the vibration reduction device 30. However, the damper mass carrier 3 is now formed with only one damper mass carrier element 5 that receives the damper masses 7 on both sides. The damper masses 7 are positioned relative to one another by space pieces 144. The coupling elements 20 are also visible in FIG. 4.

Figure 5:
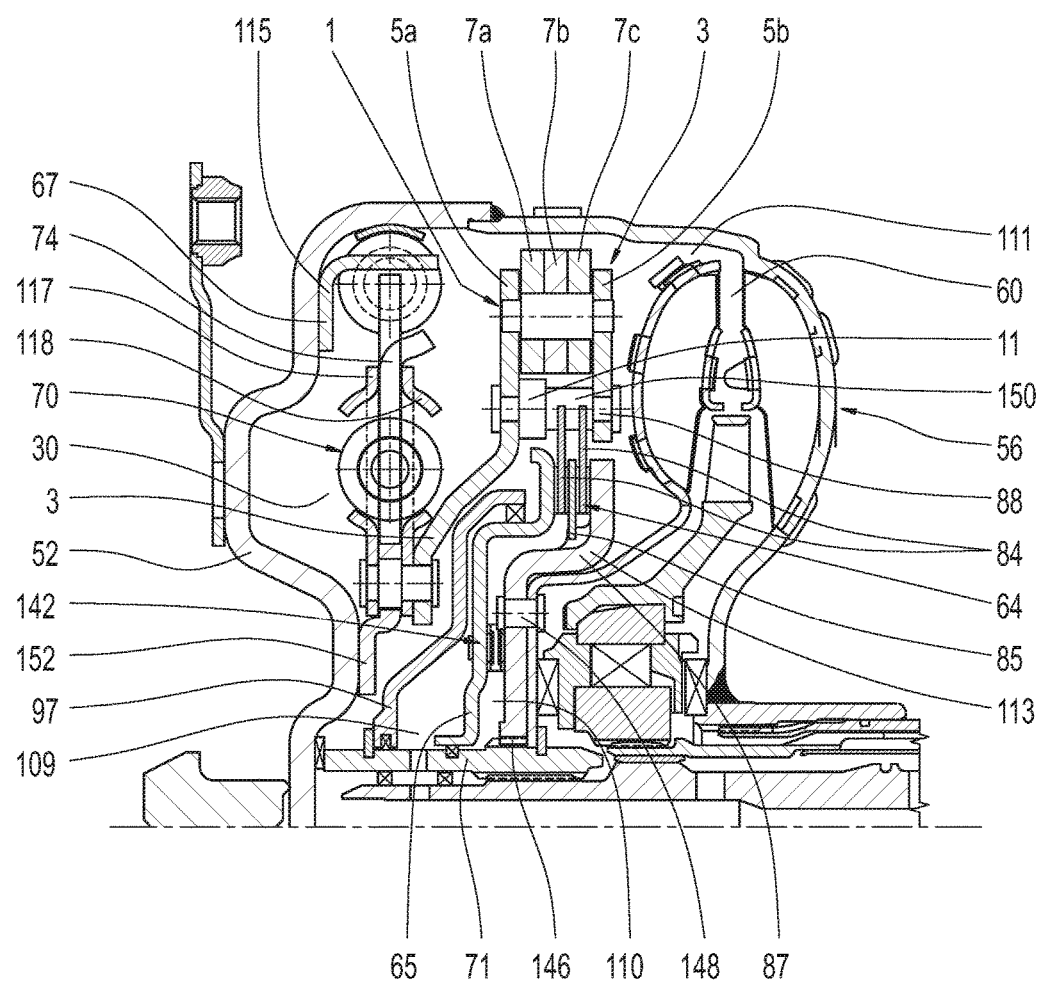
FIG. 5 is a different special arrangement of vibration reduction device and clutch device.

FIG. 5 shows a coupling arrangement 56 that corresponds to the construction according to FIG. 4 with respect to function but which diverges from it with respect to construction. Aside from the mass damper system 1, this applies in particular to the torsional vibration damper 70 in which the individual component parts—input 67 with input component 115, intermediate transmission 74 and output 72 with output components 117, 118—are constructed with geometrically simpler and, therefore, more economical configuration. While the type of construction comparable to FIG. 1 with damper masses 7a, 7b, 7c arranged axially between two damper mass carrier elements 5a, 5b of the damper mass carrier 3 is selected for the mass damper system 1, the spacer pieces 11 position the two damper mass carrier elements 5a, 5b in relation to one another are intended in this case, in a second function by a receptacle portion 150, to act as radially outer friction disk coupler carrier 88 of a clutch device 64 in that it ensures that the radially outer friction disk couplers 84 of the clutch device 64 are received so as to be fixed with respect to relative rotation but so as to be axially displaceable. As in the construction according to FIG. 4, the latter receive axially between themselves a radially inner friction disk coupler 85 of the clutch device 64 received at the receptacle component part 113 so as to be fixed with respect to rotation relative to it. Accordingly, this receptacle component part 113 also acts in a second function as radially inner friction disk coupler carrier 87 of the clutch device 64.

In contrast to the coupling arrangement 56 according to FIG. 4, the receptacle component part 113 communicates by a toothing 146 with the torsional vibration damper hub 71 and, therefore, with the driven end 73 so as to be fixed with respect to relative rotation. A riveting 148 serves to fasten the turbine 62 to the receptacle component part 113 and accordingly produces the connection between turbine 62 and driven end 73.

In contrast to the coupling arrangements 56 discussed thus far, the output 72 in the construction according to FIG. 5 is centered via the output component 117 adjacent to the housing cover 124, specifically by a centering 152 provided at housing cover 124 and, therefore, at the housing 54 acting as drive 52. Because of the centering 152, a mass damper system 1 received at the other output component 118 by the damper mass carrier 3 is also centered at the housing 54 and therefore at the drive 52.

The functioning of the axial suspension 142 in the embodiments according to FIG. 4 and FIG. 5 corresponds to that of FIG. 1. In spite of structural differences, wall 97, clutch piston 65 of clutch device 64 and receptacle component part 113 correspond with respect to function to the comparable component parts in FIG. 4 and accordingly serve to form a first pressure chamber 109 and a second pressure chamber 110. The third pressure chamber 111 serves in a known manner to receive the hydrodynamic circuit 60 and the vibration reduction device 30. Thus FIG. 5 shows another three-line system.

Figure 6:
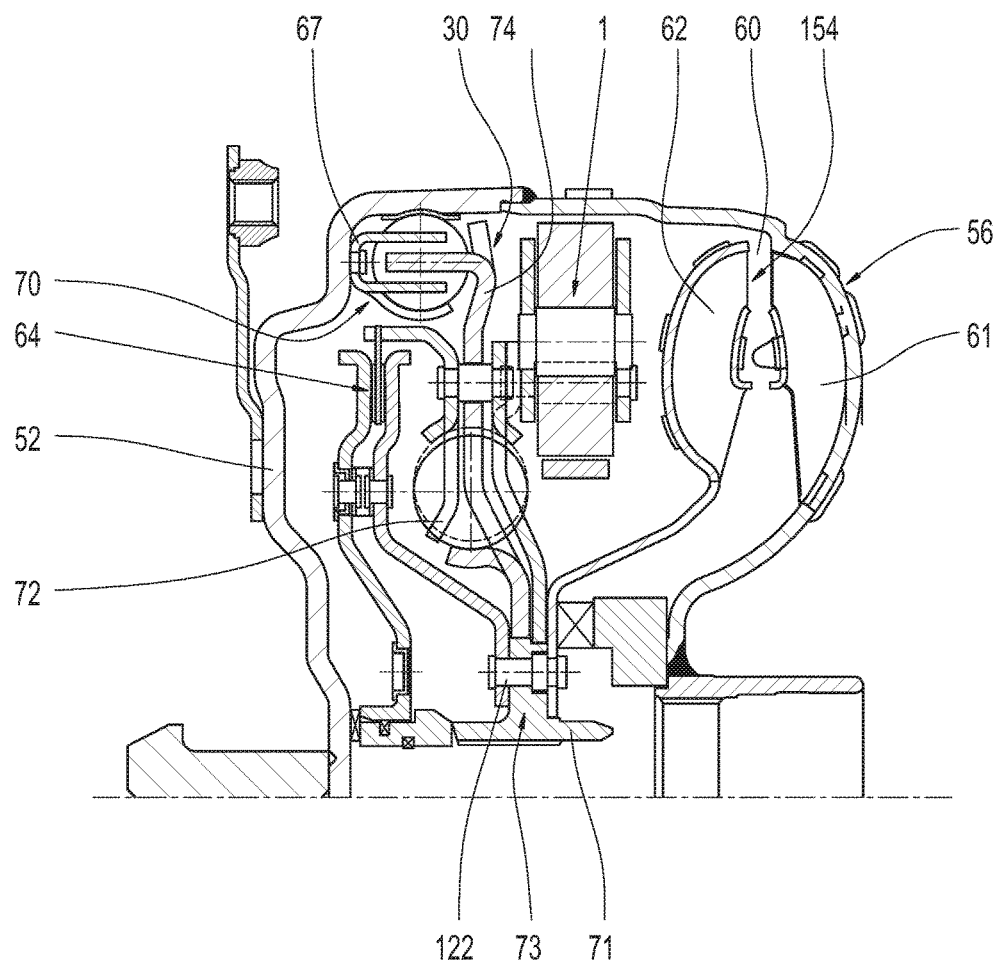
FIG. 6 is the coupling arrangement formed as hydraulic clutch.
Figure 7:
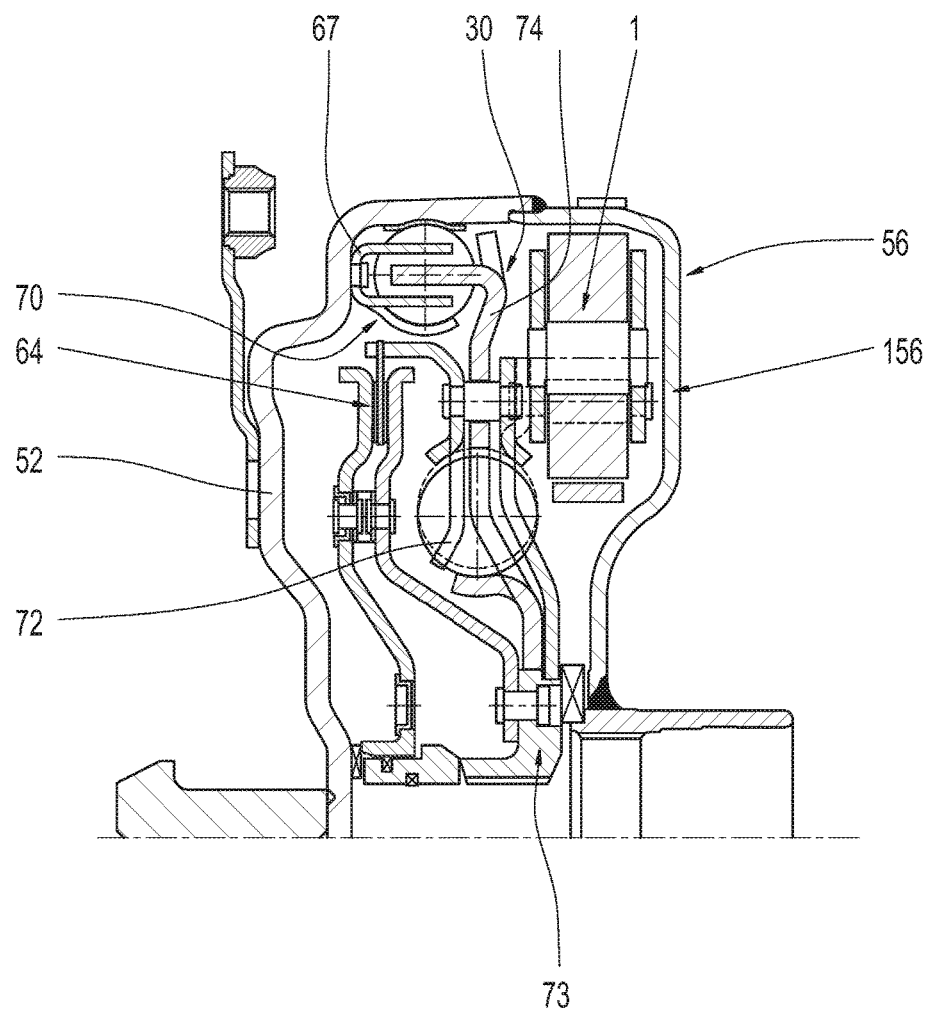
FIG. 7 is the coupling arrangement formed as wet clutch.

The coupling arrangements 56 according to FIG. 6 and FIG. 7 correspond to the construction described in detail in FIG. 1 as regards the configuration of the vibration reduction device 30 with input 67, intermediate transmission 74 and output 72 and of the clutch device 64. However, since a stator located between impeller 61 and turbine 62 is omitted, a hydraulic clutch 154 provided with hydrodynamic circuit 60 is provided in the coupling arrangement 56 of FIG. 6. As a result of this step, there is a considerable reduction in product cost and assembly cost as well as in weight compared to a hydrodynamic torque converter.

Whereas a multi-step riveting 122 is provided in the coupling arrangement 56 according to FIG. 6 for fastening the turbine 62 to the torsional vibration damper hub 71 and, therefore, to the driven end 73, a hydrodynamic circuit is completely absent in the coupling arrangement 56 according to FIG. 7. Accordingly, FIG. 7 shows a wet clutch 156 in which the driven end 73 is connected to the drive 52 solely via the vibration reduction device 30 and clutch device 64. Compared to the hydraulic clutch, there again results a considerable reduction in product costs, assembly costs and weight. Further, a wet clutch 156 of this type can be used not only as starting element but also as disconnecting element, since the synchronization between drive 52 and driven end 73 is actively controlled via the respective pressure built up by the pressure medium. On the other hand, in the coupling arrangements with hydrodynamic torque converter or with hydraulic clutch, owing to the respective hydrodynamic circuit 60, there would be an automatic synchronization between drive 52 and driven end 73 via the pressure medium circulating in the hydrodynamic circuit 60 when a connection between the vibration reduction device 30 and the driven end 73 is at least substantially cancelled during the second operating state.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A coupling arrangement comprising:
    a clutch device;
    a vibration reduction device comprising:
        at least one torsional vibration damper;
        an input which is connected to a drive; and
        an output connected to the clutch device by which a connection between the vibration reduction device and a driven end is at least substantially produced in a first operating state, and this connection is at least substantially cancelled in a second operating state, wherein the output of the vibration reduction device is centered at the driven end; and
        wherein the at least the output is centered with respect to a central axis, and the centering of output is carried out at the driven end;
    a housing of coupling arrangement configured as the drive for the vibration reduction device; and
    a mass damper system that cooperates with the at least one torsional vibration damper and connected to the output of the vibration reduction device, wherein the at least one torsional vibration damper has at least one damping unit whose output has at least two output component parts, at least one of the at least two output component parts is centered but is received so as to be rotatably movable in circumferential direction,
    wherein that at least one output component has a connection to a damper mass carrier of the mass damper system, which damper mass carrier is provided for receiving damper masses, wherein the mass damper system has a friction disk coupler carrier that receives at least one friction disk coupler of the clutch device so as to be fixed with respect to rotation relative to it.

2. The coupling arrangement according to claim 1, wherein the at least one torsional vibration damper is connected to the at least one friction disk coupler of the clutch device, which friction disk coupler is pressed against a receptacle component part fixed to the driven end for co-rotation therewith in the first operating state by a clutch piston associated with the clutch device,
    wherein in the second operating state the clutch piston at least substantially releases the at least one friction disk coupler to at least partially cancel an operative connection between the at least one friction disk coupler and the receptacle component part.

3. The coupling arrangement according to claim 1, wherein the at least one output component of the output is configured as the friction disc coupler carrier of the clutch device that receives at least one friction disk coupler of the clutch device so as to be fixed with respect to rotation relative to it.

4. The coupling arrangement according to claim 1, wherein the at least one torsional vibration damper has a plurality of damping units of which an input-side damping unit is operatively connected via an intermediate transmission to the respective output-side damping unit,
    wherein the intermediate transmission acts as input with the output-side damping unit.

5. The coupling arrangement according to claim 1, wherein the damper mass carrier of the mass damper system has two damper mass carrier elements arranged at an axial distance from one another and connected to one another by at least one spacer piece,
    wherein the at least one spacer piece acts in an auxiliary function as friction disk coupler carrier.

6. The coupling arrangement according to claim 1,
    wherein the driven end is configured as a torsional vibration damper hub,
    wherein the torsional vibration damper hub is received by at least one of:
        a spline of a driven shaft, and
        on the input and output of the vibration damping device.

* * * * *